(No Model.)
G. SEYMOUR.
METAL WHEEL.
No. 394,885. Patented Dec. 18, 1888.
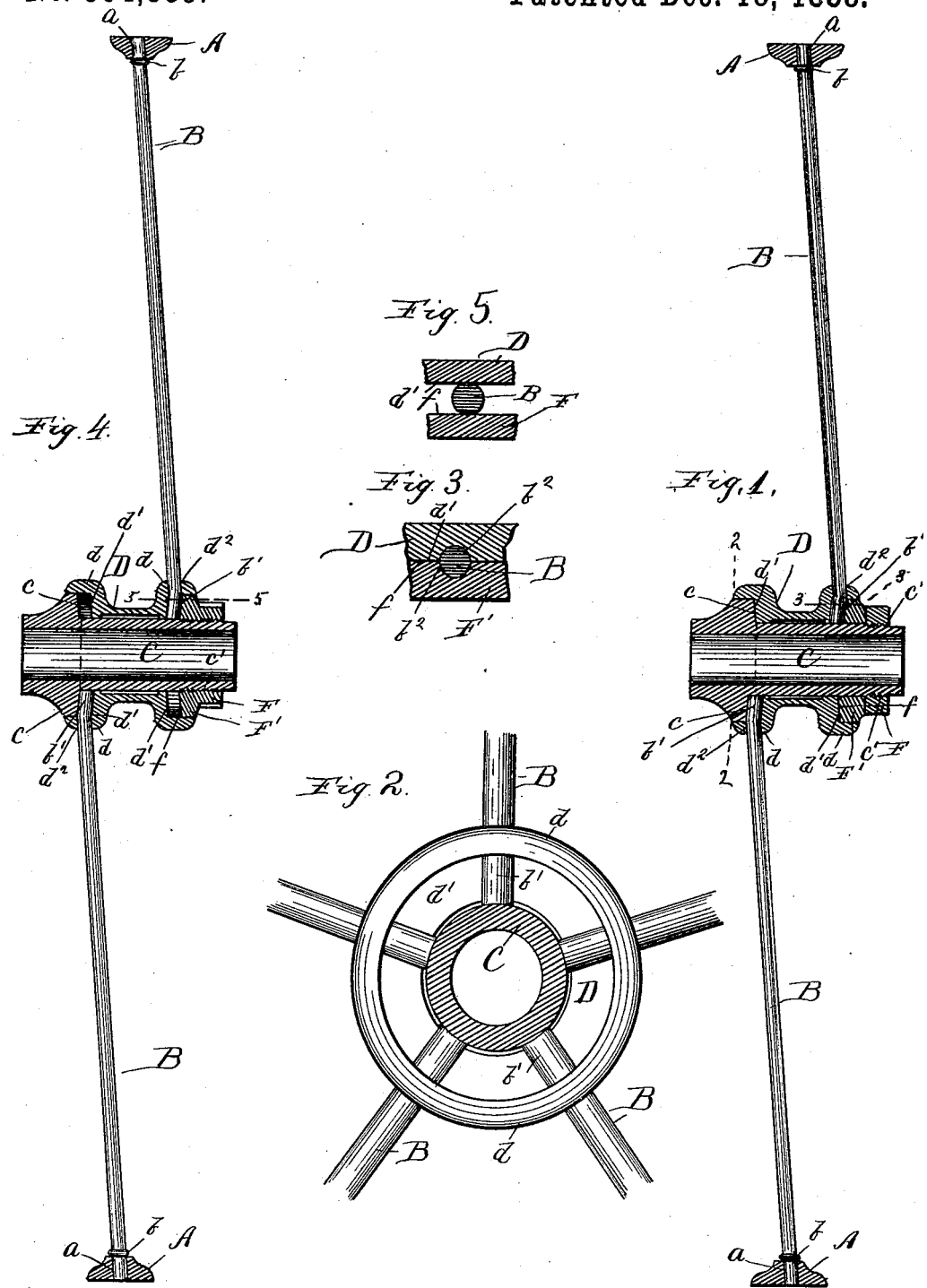
Witnesses:
Geo. C. Curtis.
H. W. Munday.
Inventor:
Grant Seymour.
By Munday, Evarts & Adcock
his Attorneys.

UNITED STATES PATENT OFFICE.

GRANT SEYMOUR, OF LA PORTE, INDIANA, ASSIGNOR TO THE NILES & SCOTT COMPANY, OF SAME PLACE.

METAL WHEEL.

SPECIFICATION forming part of Letters Patent No. 394,885, dated December 18, 1888.

Application filed August 1, 1888. Serial No. 281,639. (No model.)

*To all whom it may concern:*

Be it known that I, GRANT SEYMOUR, a citizen of the United States, residing at La Porte, in the county of La Porte and State of Indiana, have invented a new and useful Improvement in Metal Wheels, of which the following is a specification.

My invention relates to metal wheels, and more particularly to improved means for securing the metal spokes and the parts of the hub rigidly together.

Heretofore it has been customary in the construction of metal wheels to cut notches in the ends of the spokes which fit in the hub, in order to secure the spokes in the hub. Such notches materially weaken the spokes, so that frequently the notched end of the spoke breaks off, allowing the wheel to collapse. Difficulty has also been experienced where the ends of the spokes are thus cut to secure an even bearing of the parts of the hub upon each and all the spokes; and for this reason, while some of the spokes in a wheel may be tightly and rigidly held others may be more or less loose and rattle and imperfectly brace and strengthen the wheel. And where, as heretofore, each spoke is secured by independent screw-threads and nuts to the hub, the nuts in some cases are liable to loosen, the construction of the wheel is rendered expensive, and the screw-threads also weaken the spokes.

It is the object of my present improvement to provide a simple and efficient means of securing each and every spoke to the hub without in any way weakening or cutting the plain metal rods of which the spokes are made, and thus produce not only a stronger and better wheel, but at the same time save the labor and expense incident to cutting notches, tenons, or screw-threads upon the ends of the spokes.

My invention consists in the novel devices and novel combinations of parts and devices herein shown and described, and more particularly pointed out in the claims.

In the accompanying drawings, which form a part of this specification, and in which similar letters of reference indicate like parts in all the figures, Figure 1 is a radial section of a wheel embodying my invention. Fig. 2 is a section taken on line 2 2 of Fig. 1. Fig. 3 is a cross-section through one of the spokes, taken on line 3 3 of Fig. 1. Fig. 4 shows a modification wherein the shoulders between which the spokes are clamped are furnished with no radial grooves or sockets to embed the spokes; and Fig. 5 is a section on line 5 5 of Fig. 4.

In said drawings, A represents the metal tire of the wheel; B, the spokes; C, the interior box part of the hub; D, the exterior shell part of the hub, and F the nut part of the hub.

The spokes B are made of plain metal rods having slight shoulders $b$ at their outer ends, and inserted through suitable holes, $a$, in the tire and riveted thereto.

The box or interior part, C, of the hub is furnished with an exterior inclined or beveled shoulder, $c$, near one end, and with screw-threads $c'$ to receive the nut F at the other end. The shell D fits over the box C, and the diameter of the shell is enlarged at each end, as shown at $d\ d$, so as to fit over the exterior shoulder, $c$, on the box C and over the nut F. The inner face, $f$, of the nut F, or of its collar F′, is inclined similarly to the face of the shoulder $c$ on the box C. The shell D has interior shoulders, $d'\ d'$, one beveled or inclined parallel to the inclined shoulder $c$ and the other parallel to the inclined face $f$ of the nut F or collar F′. The spokes B are inserted through the spoke-holes $d^2$ in the shell D and then their inner ends are bent, as shown at $b'$, so that they will lie snugly against the inclined shoulders $d'$ of the shell D. The bent ends $b'$ of the spokes are parallel to the inclined or beveled shoulders $d'\ c$ and $d'\ f$, as is clearly shown in the drawings. After the spokes are thus inserted in the shell D, and their ends $b'$ bent down against the interior shoulders, $d'$, of the shell, the box C is inserted and the nut F screwed on. As shown in Figs. 1, 2, and 3, the shoulders $d'\ d'$ on the shell and $c$ on the box, and also the collar F′, are furnished each with radial grooves or sockets $b^2$ for the ends of the spokes to fit in. This is the preferable construction. In this construction the collar F′, separate from the nut F, is employed. If the radial grooves or sockets $b^2$ for the spokes are omitted, the collar F' need not be used or may be made integral with the nut F, as indicated in the modification shown in Figs. 4 and 5. In the modification shown in Figs. 4 and 5, where the separate collar F' is omitted, the radial grooves may, if desired, be formed in the shoulders $d'$ $d'$ and $c$ and omitted simply in the nut F.

The bent ends $b'$, with which the spokes B are furnished, serve, in connection with the inclined or bevel shoulders of the shell, box, and nut, to securely and rigidly hold each and every spoke, while at the same time the spokes are in no way weakened or cut; and as the metal rods are of the same uniform size no difficulty is experienced in obtaining a proper clamping fit of the inclined shoulders $c$, $d'$, $d'$, and $f$ against each and all the spokes, and all labor and expense of cutting or fitting the ends of the spokes are saved. By this construction, as the ends of the spokes are bent after the spokes have been inserted and riveted at their outer ends in the metal tire A, and after their inner ends are inserted through the spoke-holes in the shell D, as before stated, and as the plain metal rods are not upset or given any peculiar configuration at their inner ends, it is obvious that the bend $b'$ may be formed in each spoke at the precise point required to insure a perfect and equal clamping of each and every spoke between the opposing inclined faces $c$ $d'$ or $d'$ $f$ of the parts of the hub; and, as indicated in the drawings at Figs. 1, 2, and 4, it will be observed that the bent ends $b'$ of the spokes projecting through the shell D, abut squarely and snugly against the outer periphery of the inner or box part, C, of the hub, so that the box C will thus serve to rigidly sustain and support the spokes against the inward end-thrust thereof, and thus produce a perfectly rigid and firm wheel. The bends $b'$ in the spokes B are slight and not acute, and should, preferably, be about as indicated in the drawings in Figs. 1 and 4. As shown in the drawings at Fig. 2, the extremities of the spokes B, which abut against the outer cylindrical surface of the box C, are cut all on a circle corresponding to the cylindrical surface of said box C, against which they abut. The ends of all the spokes are thus cut off simultaneously by a revolving drill or tool after they have all been inserted through the shell D and their ends bent down, the outer ends of all the spokes being first riveted securely in the tire A, as before stated. As the ends of the plain metal spoke-rods B, which are secured to the hub, are in no way upset or given any peculiar configuration, and the bends $b'$ formed therein after the spokes have been riveted to the tire and inserted in place in the shell D, it is obvious that the bends $b'$ may be formed at the particular point along the length of the rod required to secure a rigid and equal bearing and support on the part of each and every spoke; and as the slight bends $b'$ admit or permit of the spokes projecting through the shell D it is obvious also that each and all the spokes may be trimmed or cut off at the precise point required to insure a flush or snug fit and bearing on the part of each and every spoke against the inner box part, C, of the hub against which they abut. Where, as heretofore, the ends of the spokes which are secured in the hub are upset or given some peculiar shape, and where the spokes are of a predetermined length, &c., before being riveted or secured to the tire, the unavoidable variations in length of the spokes produced by riveting the spokes to the tire, and incident also to irregularities in the tire and hub, cause great strain to be exerted upon some of the spokes while others are almost loose, so that the spokes do not and cannot properly brace and sustain the wheel. By my invention the construction of the wheel is such that the holding-bend $b'$ may be formed in each and every spoke at the precise point required to give an equal bearing and strain on every spoke and the greatest strength and rigidity to the wheel; and the same is true in respect to the length of the spokes, each spoke being cut off at the precise point required to secure a snug fit against the box C.

The wheel illustrated in the drawings is an ordinary ten-spoke double-rank wheel, five of the spokes being clamped and held in one rank between the shell and box and the remaining five in another rank between the shell and nut F or its separate collar F'. The five spokes of the one rank or series alternate those of the other in the usual way.

Those skilled in the art will understand that my invention may of course also be employed in metal wheels wherein the spokes are all arranged in a single rank around the hub, instead of a double rank, as shown in the drawings.

The act of screwing on the nut F may, if desired, serve to bend the ends $b'$ of the spokes B; but the preferable way is to bend the ends of the spokes in a suitable press before the nut F is applied. The bent ends $b'$ of the spokes abut directly against the inner or box portion, C, of the hub, so that the same will withstand the end-thrust of the spokes.

I disclaim as not of my invention the devices shown and described in Patents No. 244,742, of July 26, 1881, to Crowell, and No. 378,961, of March 6, 1888, to Hughes.

I hereby disclaim as not of my invention the devices shown and described in the following patents, to wit: No. 206,442, of July 30, 1878, to Harris; No. 209,853, of November 12, 1878, to Brown; No. 292,072, of January 15, 1884, to Tice, and No. 313,931, of March 17, 1885, to Frenier.

The method of cutting off the ends of the spokes on a true circle about the axis of the wheel after the spokes have been riveted to the tire, so that each and all of the spokes will abut snugly against the inner box part of the hub, as shown in the drawings, will be readily understood by those skilled in the art. The patent, No. 392,252, of November 6, 1888, fully shows and describes the method or means which I prefer to use for this purpose. My invention differs from the device shown, described, and claimed in Patent No. 392,234, granted November 6, 1888, to Smith. In said Smith patent one side of each and all the spokes is cut to form a holding-tenon. In my invention I secure all the advantages of the Smith construction without weakening the spokes by cutting them, as the holding-bends in my spokes may be formed at any point required after the spokes are riveted to the tire, just as the holding-tenons of the Smith patent are formed at the points required in each and every spoke.

I claim—

1. In a metal wheel, the combination, with the tire or rim A, of the plain metal-rod spokes B, riveted at their outer ends in said tire, two opposing parts of the hub furnished with inclined or beveled shoulders, said spokes having slightly-bent holding ends corresponding to the incline of said shoulders, between which they are clamped, said bent ends of the spokes projecting through the outer part of the hub and cut off flush with the inner part of the hub, against which they abut, whereby said holding-bends in said spokes may be formed and the ends thereof trimmed or cut off at the precise points required to secure the rigid bracing of the wheel by the spokes, substantially as specified.

2. In a metal wheel, the combination, with tire A, of plain metal-rod spokes B, rigidly secured at their outer ends on said tire and furnished with slight bends $b'$ at their inner ends, box C, having an inclined or bevel exterior shoulder, $c$, shell D, having inclined or beveled interior shoulders, $d'\ d'$, and an opposing part furnished with an inclined face, $f$, said spokes B being plain rods of even size, so that the bends $b'$ may be formed therein at the precise points required to secure the proper clamping and holding of each and every spoke between the inclined shoulders or faces of the opposing parts of the hub, and said bent ends $b'$ projecting through said shell D and being cut off flush with the outer periphery of said box C, against which they abut, substantially as specified.

3. In a metal wheel, the combination, with tire A, of the plain metal-rod spokes B, riveted at their outer ends to said tire and furnished with bends $b'$ at their inner ends, box C, having inclined exterior shoulder, $c$, shell D, having inclined interior shoulders, $d'\ d'$, and collar F', having inclined face $f$ and nut F, said shoulders $c\ d'\ d'$ and collar F' having radial grooves $b^2$ to receive the bent ends $b'$ of the spokes, said spokes B being of even size, so that the bends $b'$ may be formed therein at the precise points required to secure the proper clamping and holding of each and every spoke between the inclined shoulders or faces of the opposing parts of the hub, and said bent ends $b'$ projecting through said shell D and being cut off flush with the outer periphery of said box C, against which they abut, substantially as specified.

4. In a metal wheel, the combination, with tire A, of plain metal-rod spokes B, riveted to said tire and having bent inner ends, $b'$, box C, having inclined exterior shoulder, $c$, shell D, having enlarged ends $d$, provided with holes through which said spokes are inserted, said shell being furnished with inclined shoulders $d'\ d'$, and an opposing part furnished with an inclined face, $f$, said spokes B being of even size, so that said bends $b'$ may be formed therein at the points required after the spokes are riveted to the tire and inserted through said shell, and said bent ends $b'$ projecting through said shell and being cut off flush with the outer periphery of said box C, against which they abut, substantially as specified.

GRANT SEYMOUR.

Witnesses:
E. H. SCOTT,
EMMET SCOTT.